INVENTOR.
JAMES BERNARD SMITH
ATTORNEY

Sept. 14, 1965  J. B. SMITH  3,205,640

WELL FLUID SEPARATING METHOD

Filed July 24, 1962  3 Sheets-Sheet 3

INVENTOR.
JAMES BERNARD SMITH

BY

ATTORNEY

United States Patent Office 3,205,640
Patented Sept. 14, 1965

3,205,640
WELL FLUID SEPARATING METHOD
James Bernard Smith, 209 S. Church St., Aztec, N. Mex.
Filed July 24, 1962, Ser. No. 212,105
14 Claims. (Cl. 55—32)

The present invention relates to a new and useful improvement in a method for separating either high or low pressure streams of well fluid into gas, water and oil.

The continuing search for oil has led to the drilling of deeper and deeper wells, which in turn have resulted in the production of well fluids having a greater variety of hydrocarbons contained therein than encountered heretofore. Also, the fluids from these deeper wells are produced under far greater pressures than normally encountered in the past. The handling of the well fluids from these deeper wells not only presents a more difficult problem as to the manner in which the fluid may be separated into gas, oil and water, but also as to how high pressure gas in such a stream can be reduced in pressure to a degree where it may be safely discharged into a gas transmission line. This problem is further complicated due to the fact that the composition of the well fluid may change appreciably as the well is produced, particularly with regard to water content, and the manner in which this water is commingled or associated with the oil.

A primary object in devising the present method is to provide improved means for separating both high pressure and low pressure streams of well fluid that may vary over a period of time as to the percentage of oil, gas and water contained therein into these constituents and to concurrently lower the pressure of the gas to a degree where it can be safely discharged into a gas transmission line.

Another object of the invention is to provide a method by which separation of liquid and gas from well fluid is accomplished by one step of pressure reduction, with the gas thereafter being subjected to a water absorbing liquid at a temperature that is substantially the same as that at which the expansion of the gas initially takes place.

A further object of the invention is to provide a method in which first and second temperature control zones of separation are effected, each of which lower the pressure of the gas in the well fluid to a desired degree, and which zones communicate with an absorbing liquid held in a confined space, with a constant temperature being maintained in the control zones as well as the liquid in the confined space.

A still further object of the invention is to provide a method by which well fluid is separated into gas and liquid in one or more temperature control zones that are in communication with an absorbing liquid held in a confined space, with a common temperature being maintained in these zones and confined space whereby the liquid resulting after separation of gas from the well fluid is subjected to a second operation in which the liquid is separated into water and oil.

Yet another object of the invention is to provide a method by which well fluid is separated into gas, oil and water, with a portion of the gas that in previously available apparatus would be lost to the atmosphere being utilized for heating purposes to effect said common temperature, both when a single phase of separation is utilized as well as when the method includes a two-phase separation.

These and other objects and advantages of the present invention will become apparent from the following description thereof, and from the accompanying drawings illustrating the same, in which:

FIGURE 4 is a partial perspective view of a modification of the first form of the apparatus.

Figure 1:
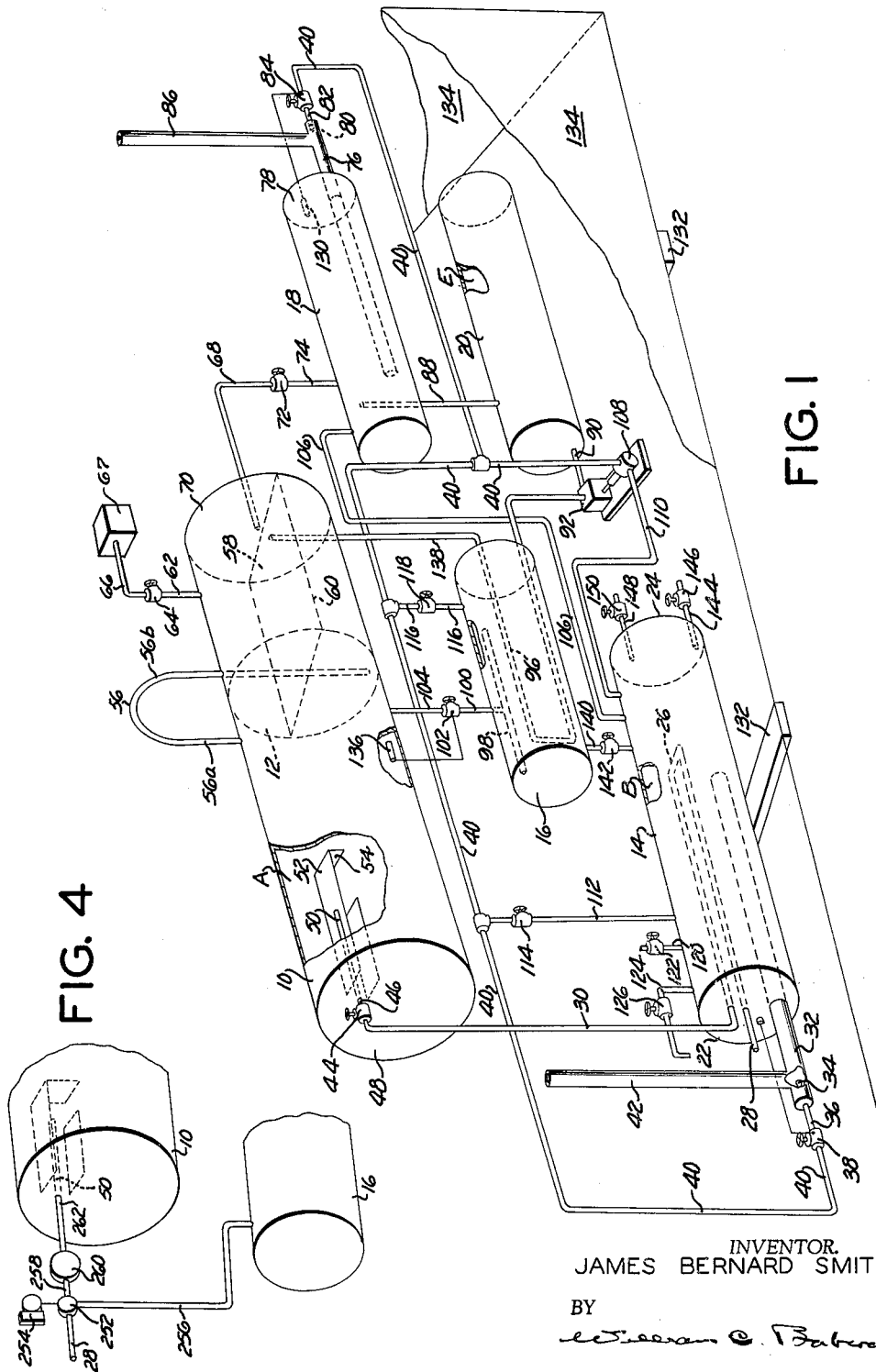
FIGURE 1 is a perspective view of an apparatus adapted for use in carrying out a method of handling well fluid in which there is but a single phase of separation of the gas from the liquid forming a part of the well fluid.

Referring now to FIGURE 1 of the drawings for the general arrangement of the first form of apparatus for carrying out the method of the present invention, it will be seen that a first elongate vessel 10 is provided that has an intermediately disposed partition 12 situated within the confines thereof, which divides the interior of the vessel into a gas and liquid separation zone A and a confined space D in which a water-absorbing liquid is held. A second vessel 14 is disposed below the first vessel and defines a heat exchanger zone B within the interior thereof. A third elongate vessel 16 is also provided which is preferably located above the second vessel 14, below the first vessel 10. The interior of vessel 16 serves as a liquid accumulating zone C.

A fourth vessel 18 is situated to the right, below the first vessel 10, and serves as a reboiler as will be explained hereinafter. A fifth vessel 20 is located below the fourth vessel 18 (FIGURE 1) which serves as a liquid storage space E. Second vessel 14 has end pieces 22 and 24 respectively. A first heat exchanger coil 26 is situated within the confines of vessel 14, and one end thereof extends through end piece 22 and is connected to a pipe 28 that extends to the source of the well fluid to be treated. A second end of coil 26 also extends through end piece 22 and is connected to a pipe 30 which extends upwardly, as best seen in FIGURE 1.

A heater tube 32 projects through end piece 22 into the confines of the second vessel 14, and this heater tube is heated by a burner 34 that is supplied with gas through a tube 36. A thermostatically controlled valve 38 is connected to tube 36 as well as to a second tube 40. Tube 40 is connected to a source of gas and will later be described in detail. A stack 42 (FIGURE 1) extends upwardly from the heater tube 32.

Pipe 30 is connected to a choke valve 44 from which a pipe 46 projects through an end 48 of the first vessel 10 to develop into a nozzle 50. A partial enclosure 52 that includes an end plate 54 is situated within the confines of vessel 10 and extends around the nozzle 50. Due to the pressure at which it is delivered to the nozzle 50, the well fluid discharges therefrom as a spray onto the end plate 54, with the liquid droplets in the spray coalescing on plate 54 into droplets of sufficient size as to flow downwardly on the plate by force of gravity into the lower portion of the liquid separation zone A. The gas, of course, separates from the spray discharged from nozzle 50 because due to its lighter weight it remains above the liquid in the separation zone A.

An inverted U-shaped pipe 56 is provided having a leg 56a which is connected to the vessel 10 in such a position as to be in communication with the upper right-hand portion of the separation zone A as illustrated in FIGURE 1. Pipe 56 also includes a second leg 56b that extends downwardly through vessel 10 a substantial distance to the right of the partition 12. The confined space D in vessel 10 serves to hold a water-absorbing liquid 58 that is normally maintained at a level 60 therein. Leg 56b extends below the level 60 whereby gas discharged through the pipe 56 must bubble up through the liquid 58 prior to discharging through a pipe 62 communicating with the upper right-hand interior of vessel 10.

The pipe 62 is connected to a valve 64, which in turn is connected to a pipe 66 that extends to a gas transmission line (not shown) or other storage facilities for the gas discharging from the confined space D. A liquid-absorbant discharge line 68 extends from an end 70 of vessel 10 to a valve 72. Valve 72 is connected by pipe 74 to the upper portion of the fourth vessel 18 which serves as a reboiler. A heater tube 76 extends through an end 78 of vessel 18 into the confines thereof. A gas burner 80 is situated at the right-hand end of heater tube 76 and is connected by a tube 82 to a thermostatically controlled valve 84. A tube 40 joins valve 84 to a source of gas as will be described hereinafter. A stack 86 extends upwardly from heater tube 76 (FIGURE 1).

An overflow pipe 88 extends downwardly from the confines of fourth vessel 18 to the upper left-hand portion of the fifth vessel 20. A tube 90 extends from the lower left-hand end of vessel 20 to the suction side of a pump 92. The discharge side of pump 92 is connected to a tube 94 which communicates with a heat exchanger 96 situated within the confines of the third vessel 16. A perforated header 98 is situated within vessel 16 above the heat exchanger 96 and is connected to a tube 100 that extends to a valve 102. A tube 104 extends upwardly from valve 102 and is in communication with the lower interior portion of vessel 10 situated to the left of the partition 12 as shown in FIGURE 1. A tube 106 in connected to the upper left-hand interior portion of the fourth vessel 18 and extends to the upper interior portion of the second vessel 14. Tube 106 provides for escape of water vapor and other materials that have a lower boiling point than the liquid absorbent material 58 from vessel 18 to vessel 14.

The pump 92 is driven by a gas-operated motor 108, and gas under pressure is supplied to the motor 108 through the tube 40. After passing through the motor the gas discharges through a tube 110 and is returned to the confines of the second vessel 14. Gas is supplied to the tube 40 by a tube 112 which communicates with the interior of the second vessel 14 shown in FIGURE 1. The flow of gas through tube 112 may be controlled by a valve 114. Gas is also supplied to tube 40 by a tube 116 which is connected thereto and is in communication with the interior of the third vessel 16 as well. Tube 116 has a valve 118 therein that may be used to control the flow of gas therethrough, and as previously mentioned, tube 40 is connected to the burners 34 and 80.

A pipe 120 is provided which communicates with the upper interior portion of the second vessel 14. A valve 122 is connected to pipe 120, which pipe and valve permit the second vessel 14 to be filled with liquid when the first form of the invention is initially used. A pipe 124 is also provided that is in communication with the upper interior portion of vessel 14. Pipe 124 is connected to a valve 126, and this pipe and valve permit vessel 14 to be vented to the atmosphere when required.

The valve 38 which controls the flow of gas to the burner 34 opens and closes in response to a thermostatic element 128 that is in contact with the liquid in vessel 14. Valve 84 that regulates the flow of gas to burner 80 is controlled by a thermostatic element 130 which is responsive to the temperature of the liquid in the fourth vessel 18. The vessels above described are held in the elevated relationship shown in FIGURE 1 by a conventional framework 132, only the lower portion of which is shown in FIGURE 1. The framework 132 supports upwardly extending side walls and end walls 134 to prevent dissipation of heat to the ambient atmosphere from the vessels when the invention is installed in a location where it is subjected to wind, snow, rain or the like.

Following is a description of the operation of the first separation method. Well fluid is discharged into the separating apparatus through the pipe 28 to flow through the heat exchanger 26 and discharge from the nozzle 50. As previously mentioned, the well fluid is under pressure, and as it discharges in the form of a spray from the nozzle 50 to impinge on the plate 54, the gas in the fluid expands and the confined liquid and gas separation zone A in the first vessel 10 is cooled. The droplets of liquid coalesce on the plate 54 and drop downwardly into the lower portion of the zone A where they flow downwardly through tube 104 to the valve 102. Valve 102 is opened by a float or other conventional element 136 that is in communication with the liquid which flows to the lower poriton of separation zone A. Element 136 causes valve 102 to open when the liquid level in vessel 10 rises to a predetermined elevation.

The gas that separates from the well fluid in separation zone A flows upwardly through the pipe 56 and downwardly into the first confined space D. As the gas discharges from the lower end of the leg 56b, it bubbles upwardly through a water-absorbing liquid 58 which is maintained at a level 60. After the gas has bubbled upwardly through the liquid 58 and is dried, it discharges through the pipe 62, valve 64, and pipe 66 to a second confined space 67 such as a transmission line, storage facility, or the like.

Due to the expansion thereof in the separation zone A the gas is cool, and is likewise in a cool state when it is delivered into the first confined space D. The water-absorbing liquid 58 is, of course, cooled by the gas. When the liquid 58 has reached the level 60 shown in FIGURE 1, it overflows through the pipe 68 to pass downwardly through valve 72 and pipe 74 into the confines of the fourth vessel 18 where it is heated by the heater tube 76. The water-absorbing liquid 58 when in the fourth vessel 18 is heated to such a degree that water contained therein is vaporized and gas that may be occluded in the liquid expands and escapes therefrom. The water in the form of steam and the gas that has evolved in the fourth vessel 18 escape through the pipe 106 and discharge into the third vessel 14, as shown in FIGURE 1.

The liquid 58 that has been heated in the fourth vessel 18 flows into the pipe 88 when a desired level is reached in the fourth vessel, with the liquid after entering the pipe 88 flowing downwardly therethrough by force of gravity into the fifth vessel 20. The heated water-absorbing liquid in the liquid storage space E is withdrawn therefrom through pipe 90 into the pump 92 and then is discharged from the pump through pipe 94 to heat exchanger 96 situated within the confines of the third vessel 16. As the liquid flows through the heat exchanger 96 it is subjected to the cooling effect of liquid that flows downwardly over the heat exchanger, and is discharged thereon from the perforated header 98.

The heated liquid in the heat exchanger 96 is cooled, and this cooled liquid discharges upwardly from the heat exchanger through a pipe 138 into the confined space D. Due to this heat exchange, the liquid 58 is maintained at a substantially constant temperature, even though the liquid in the confined space D is constantly subjected to a cooling action by the cooled gas that discharges into the confined space from the tube 56. Separation of gas from the well fluid spray is most effective when the temperature is maintained in the neighborhood of 39° F. However, separation of the well fluid into water and oil after the gas has been separated therefrom is most advantageously carried out at between 90° and 110° F.

Liquid from the liquid accumulating zone C, which is the interior of the third vessel 16, flows therefrom by force of gravity through a pipe 140 and valve 142 into the confines of the second vessel 14. The liquid flowing into the second vessel 14 serves as a heat transferring medium between the heater tube 32 and the heat exchange coil 26. Water that accumulates in the second vessel 14 can be discharged therefrom through a pipe 144 that is provided with a valve 146. In the event the liquid flowing into the second vessel 14 contains a quantity of oil sufficient to make it commercially worthwhile to recover the same, the second vessel 14 may be provided with a pipe 148 having a valve 150 connected thereto. The oil that accumulates in the second vessel 14 floats on the water contained therein and permits the two liquids to be separated by flowing through the pipes 144 and 148 previously mentioned.

The flow of gas to the burner 34 is controlled by the thermostatic element 128 and is so regulated that after the well fluid flows through the heat exchange coil 26 it is at such a temperature that after expansion of the gas mixed therewith, the temperature of the spray will be at substantially 39° F. as it discharges from the nozzle 50. The flow of gas through valve 84 to the burner 80 is controlled by the thermostatic element 130 to such a degree that after the water-absorbing liquid has been heated and returned to the confined space D the temperature thereof when it mixes with the liquid 58 therein is such that the temperature of the liquid 58 in the confined space will be held at substantially that of the cooled gas as it discharges into the confined space through the leg 56b of pipe 56.

Due to the flow of the water-absorbing liquid as described, it will be seen that the water-absorbing liquid 58, such as glycol or the like, may be heated to a sufficiently high temperature as to vaporize the water absorbed therein, as well as to cause the expulsion of occluded gases therefrom, with this liquid being returned to the confined space D at a temperature that holds the liquid 58 at a substantially constant temperature therein. Thus, the separation of gas from the balance of the well fluid can be effected at optimum low temperature conditions in the separation zone A, as a first phase of separation, with the cooled liquid then draining from the separation zone to be utilized for cooling the water-absorbing liquid 58 to hold the temperature thereof in the confined space D at substantially the same temperature as exists in the separation zone A.

The first method described hereinabove and as carried out by the apparatus shown in FIGURE 1 is preferably used on those wells in which the well fluid mainly comprises gas and water and but a small amount of oil. Also, the first method is preferably used where the gas in the well fluid is at such a pressure that it can be reduced to a pressure slightly greater than that maintained in a transmission line (not shown) or other storage facilities.

It will be particularly noted in FIGURE 1 that the gas supplied to the burners 34 and 80 is provided by gas that escapes from the well fluid as the liquid is heated in the liquid-accumulating zone C as well as in the heat exchange zone B. Thus, gas that would normally be wasted is utilized in the present invention to effectively and efficiently cause separation of well fluid into gas and water, with the first phase of separation of the well fluid into gas and liquid being effected in the liquid separation zone A at a first pressure, and the well fluid minus substantially all the gas initially therein being separated into oil and water in the heat exchange zone B at a second pressure, which is substantially lower than the first pressure and at a temperature that is substantially higher than that prevailing in the separation zone A and confined space D.

Figure 2:
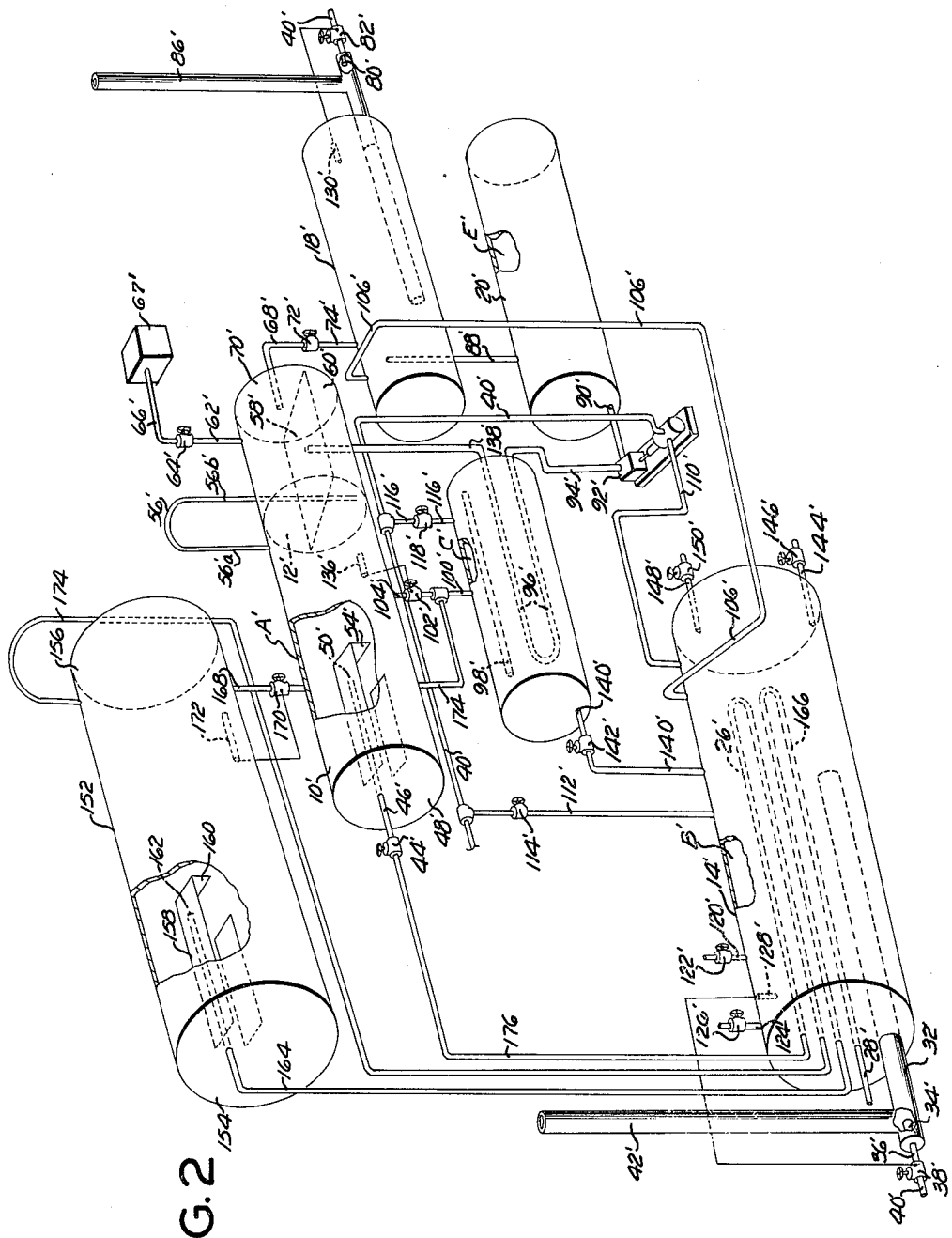
FIGURE 2 is a perspective view of an apparatus that may be utilized to handle well fluid by a single phase of separation, but with the reduction of the gas pressure in the well fluid being carried out in two stages.

A second separation method can be carried out by use of the second apparatus shown in FIGURE 2 that is similar to the first form, but differs therefrom in that the pressure of the gas in the well fluid is reduced in two stages rather than in one stage. The second form of separator is particularly adapted for use with high pressure well fluids, and includes a number of components identical to those in the first form and are identified in FIGURE 2 by the same numerals, but to which a prime has been added.

The second form of fluid separating apparatus includes a sixth vessel 152 in which the first stage of the separation of gas from the liquids in the well fluid takes place. The vessel 152 has two ends 154 and 156, and a partial enclosure 158 is provided within the vessel 152, which enclosure has a plate 160 associated therewith. A nozzle 162 is disposed within vessel 152 which is so located that the well fluid can discharge therefrom as a jet to impinge on plate 160. The fluid droplets in the spray coalesce on plate 160 and fall downwardly by force of gravity to the bottom of vessel 152. Nozzle 162 is connected to a pipe 164 that extends through end 154 of vessel 152. A second heat exchanger 166 is provided in second vessel 14' with one end of this heat exchanger being connected to the pipe 28' and the other end thereof to the pipe 164.

The liquid that separates from the well fluid in sixth vessel 152 can flow downwardly by force of gravity through a pipe 168 to a valve 170. Valve 170 is controlled by an element 172 situated within vessel 152 and is in contact with the liquid therein. Element 172, which may be a float or the like, opens valve 170 when the liquid level in vessel 152 rises to a predetermined height. Valve 170 is connected by a pipe 174 to pipe 100', and liquid from both the sixth vessel 152 and the first vessel 10' discharge through the perforated header 98' as previously described.

After the gas has been reduced in pressure in the sixth vessel 152 it escapes therefrom through a pipe 175 which is connected to one end of the heat exchanger 26' located in the second vessel 14'. The other end of the heat exchanger 26' is connected by a pipe 176 to the valve 44'. The gas and droplets of fluid that may be entrained therewith which discharge from the sixth vessel 152 through the pipe 175 are heated by the heat exchanger 26' and then discharged again as a spray from the nozzle 50' in precisely the same manner described herein with regard to the first form of the invention. As the gas discharges from the nozzle 50', it is subjected to a second stage of pressure reduction, and the operation of the second form of fluid separating apparatus from this point on is precisely the same as that of the first form thereof.

Operation of the first method was described in detail, and accordingly, the second method need not be described in detail other than as outlined above.

Figure 3:
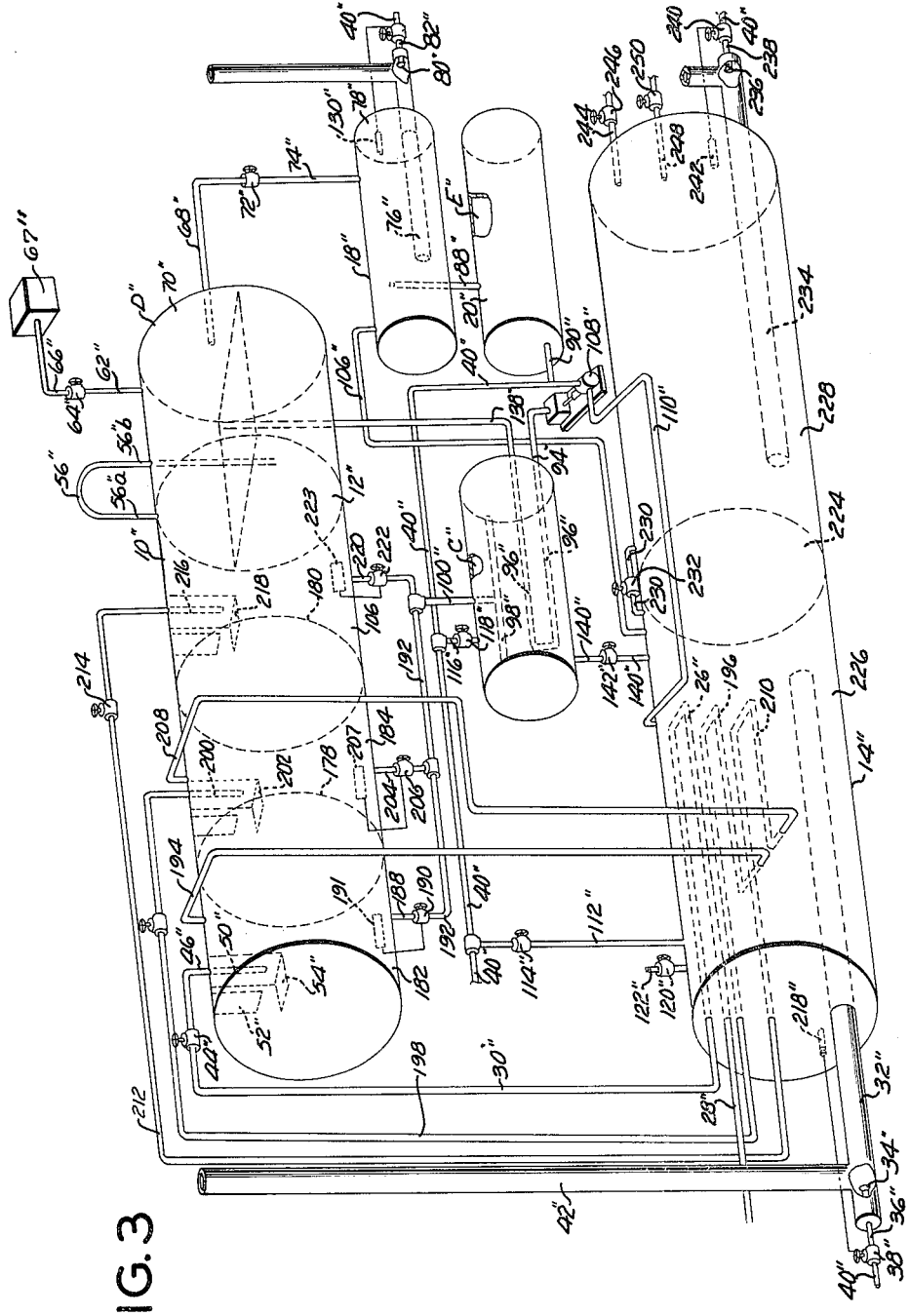
FIGURE 3 is a perspective view of an apparatus that may be utilized to handle well fluid having a high gas pressure by a two-phase separation with the gas pressure being progressively lowered in three stages.

A third separation method can be carried out by means of the third form of the apparatus shown in FIGURE 3 that is particularly adapted for use on well fluid that is under high pressure. A number of the components comprising this third form of the apparatus are common to the first form thereof, and those components are referred to in the drawings by the same numerals used in the first form but to which a double prime (″) has been added.

The vessel 10″, in addition to the partition 12″ therein also has two more partitions that are in longitudinal spaced relationship and identified in FIGURE 3 by the numerals 178 and 180. Partitions 178 and 180 and the partition 12″ serve to define three liquid separating zones 182, 184 and 186 in vessel 10″. The well fluid discharges through the pipe 28″ to the first heat exchanger 26″. Heat exchanger 26″ is connected by the pipe 30″ to the valve 44″, which is in turn connected by the pipe 46″ to the nozzle 50″.

The first stage of separation of gas from the liquid in the well fluid takes place as the fluid is sprayed from the nozzle 50″ to impinge on the plate 54″ in the first separation zone 182. As the liquid separates from the gas in the first zone 182 it flows therefrom through a pipe 188 and valve 190 to a header 192 that is connected to the pipe 100″. Gas and droplets of liquid that may be entrained therewith discharge from the first zone 182 through a pipe 194 that is connected to a second heat exchange tube 196 situated in the second vessel 14″. The gas passes through the second heat exchange tube 196 and absorbs heat in vessel 14″ to then discharge through a pipe 198 to a second nozzle 200 situated in the second separation zone 184.

The gas from the nozzle 200, together with droplets of fluid that may be carried therewith, impinges on a plate 202 and flows therefrom to the bottom of the second separation zone 184. The liquid cooling in the bottom of zone 184 flows therefrom through a tube 204 to a valve 206 and through this valve 206 to the header 192. Gas and entrained droplets of liquid can escape from the second separation zone 184 through a pipe 208 that extends to a third heat exchange tube 210 situated in second vessel 14″. The gas and entrained liquid are warmed as they pass through the third heat exchange tube 210 and flow therefrom through a pipe 212 and valve 214 to a third nozzle 216. The gas and droplets of liquid entrained therewith discharge from nozzle 216 onto a plate 218 that is held at a fixed position in the third expansion zone 186. After impinging on the plate 218 the liquid drops by force of gravity to the bottom of the third expansion zone 186 and flows therefrom through a tube 220 and valve 222 to the header 192. Gas escapes from the third separation zone 186 to the confined space D″ as previously described. The valves 190, 206 and 222 are opened by elements 191, 207 and 223 respectively when the liquids in zones 182, 184 and 186 rise to predetermined liquid levels therein.

The function of the three separation zones 182, 184 and 186 is to permit a three-stage reduction in the gas pressure in the well fluid prior to discharge thereof into confined space D″. A partition 224 is intermediately situated in the second vessel 14″ and divides the same into a third confined zone 226 wherein the heat exchange tubes 26″, 196 and 210 are located, and a fourth confined zone 228. Zones 226-228 are connected by a pipe 230 which is provided with a valve 232. A heater tube 234 is situated within the fourth confined zone 228, and this heater tube includes a burner 236 through which gas is supplied by a tube 238 that is connected to a valve 240. The valve 240 is thermostatically controlled by an element 242 that is situated within the confined space 228. The heater tube 234 is utilized to heat the liquid in fourth zone 228 to a temperature which will permit optimum separation of the oil and gas into separate strata. The oil, of course, floats on top of the water and can be withdrawn from the fourth confined zone 228 by means of a pipe 244. Flow of oil through the pipe 244 is controlled by a valve 246, and water can be withdrawn from space 228 through a pipe 248. Flow of water through pipe 248 is controlled by a valve 250.

Operation of the third member is similar to that of the first method except that the gas pressure is reduced in stages in the separation zones 182, 184 and 186. Also, the confined spaces 226 and 228 permit the exchange of heat from liquid in the third confined zone 226 to be effected. After gas has been removed from the well fluid, fourth confined zone 228 permits separation of this fluid into oil and water, which separation can be carried out at a different temperature prevailing in the third confined zone 226 due to the use of the separate heater tube 234. In all other respects, the operation of the third method of the invention is identical to that of the first method and the description thereof need not be repeated. Gas to the burners 34″, 80″ and 236 is supplied from the tube 40″ which receives gas that is discharged from the confined space 226 as well as from the liquid accumulating zone C″.

A modification of the first separation method can be carried out with the apparatus shown in FIGURE 4 that is particularly adapted for use with well fluid that is discharged at a low pressure. The heat exchange tube 26 is eliminated in this modification. The pipe 28 extends to a valve 252 that is periodically positioned by a clock mechanism 254 to discharge well fluid through a by-pass line 256 to the third vessel 16. Valve 252 is connected by a line 258 to a check valve 260, which in turn is connected by a tube 262 to the nozzle 50. Check valve 260 maintains the pressure within vessel 10, and only fluid from the pipe 28 is discharged into the third vessel 16. Previous to the arrangement shown in FIGURE 4 it has been common practice to discharge fluid from the pipe 28 into a pit. This modification provides the distinct advantage that waste of well fluid by discharge into a pit is avoided.

Although the present invention is fully capable of achieving the objects and providing the advantages hereinbefore mentioned, it is to be understood that it is merely illustrative of the presently preferred embodiments thereof and that I do not mean to be limited to the details of construction herein shown and described, other than as defined in the appended claims.

I claim:
1. A method of separating a well fluid that is under pressure into water, oil, and gas, including steps of:
 (a) successively discharging said well fluid into first, second and third confined zones that are in valved communication;
 (b) successively discharging gas as it separates from said well fluid in said first, second and third confined zones to the exteriors thereof;
 (c) directing said discharging gas from said first zone that has been cooled by expansion during separation from said well fluid into a first confined space in which a water absorbing liquid is contained;
 (d) subjecting said gas in said first confined space to a second confined space for subsequent commercial use;
 (e) recirculating said water absorbing liquid between said first confined space and a third confined space;
 (f) burning said gas that separates from said fluid in said second and third zones to heat said water absorbing liquid in said third confined space to the extent that water therein is transformed into steam, and said fluid in said third zone to a temperature at which stratification of said fluid into a layer of oil and water occurs;
 (g) transferring heat from said water absorbing liquid as it recirculates to said fluid in said second zone to encourage the separation of gas from said fluid in said second zone; and
 (h) transferring heat from said fluid in said third zone to said well fluid prior to entrance of said well fluid into said first zone, with said heat transfer preventing freezing of water in said well fluid in said first zone as gas expands in said first zone and separates from said well fluid therein.

2. A method as defined in claim 1 which includes the further step of directing said steam after discharge from said third confined space to said third confined zone to assist in heating said fluid in said third confined zone.

3. A method as defined in claim 1 which includes the further step of withdrawing gas from said second zone at a sufficiently rapid rate as to maintain the pressure in said second zone below the pressure in said first zone.

4. A method as defined in claim 1 which includes the further step of permitting gas separating from said liquid heated in said third confined zone to discharge from said third confined zone at a sufficiently rapid rate as to maintain the pressure in said third confined zone below that in said second confined zone.

5. A method of separating liquid and gas from a well fluid that is under pressure, including the steps of:
(a) heating said well fluid;
(b) discharging said fluid that has been heated into a first gas and liquid separating zone that is maintained at a first pressure substantially below that on said fluid as it enters said first zone, with the liquid and gas comprising said fluid in said first zone being cooled to a first temperature due to the expansion of said gas in said first zone;
(c) withdrawing gas as it separates from said well fluid in said first zone at a sufficiently rapid rate to maintain said first pressure in said first zone;
(d) discharging said cooled gas after it leaves said first zone into a first confined space where it contacts a water-absorbing liquid and cools said liquid;
(e) discharging said gas from said first confined space after it has contacted said liquid to a second confined space exteriorly of said first confined space for commercial use;
(f) withdrawing said cooled water-absorbing liquid from said first confined space and directing the same into a third confined space;
(g) heating said cooled water-absorbing liquid in said third confined space to the extent that water therein is vaporized to steam and said steam is discharged from said third confined space;
(h) discharging the cooled liquid that separates from said gas in said first liquid and gas separating zone into a second confined zone wherein the pressure is maintained below said first pressure to permit the further separation of gas from said liquid, with said gas as it separates from said liquid in said second zone being withdrawn from said second zone;
(i) cooling said water-absorbing liquid after said water has been vaporized therefrom by a heat exchange between said water-absorbing liquid and the cooled liquid in said second zone;
(j) discharging said water-absorbing liquid that has been cooled by said heat exchange back into said first confined space; and
(k) discharging the liquid in said second zone that has been heated by said heat exchange to a second temperature greater than said first temperature into a third zone where said liquid can stratify into layers of water and oil if any oil is present therein, and any gas carried to said third zone with said liquid will separate therefrom.

6. A method as defined in claim 5 which includes the further step of:
(a) burning gas that separates from said fluid after said fluid is discharged into said first zone to heat said fluid prior to entry thereof into said first zone to a degree that said first temperature is maintained in said first zone, with said first temperature being above that at which any of the components in said fluid would freeze due to the expansion of gas in said fluid in said first zone.

7. A method as defined in claim 5 which includes the further step of:
(a) burning gas as it is withdrawn from said liquid in said second zone to heat fluid prior to entry of said fluid into said first zone to a degree that said first temperature is maintained in said first zone, with said first temperature being above that at which any of the components in said fluid would freeze due to the expansion of gas in said fluid in said first zone.

8. A method as defined in claim 5 which includes the further step of:
(a) controlling the rate of flow of liquid from said first zone into said second zone to maintain the pressure in said second zone below said first pressure in said first zone.

9. A method as defined in claim 5 which includes the further steps of:
(a) controlling the rate of flow of liquid from said first zone to said second zone; and
(b) controlling the rate of discharge of gas from said second zone to maintain the pressure in said second zone below said first pressure in said first zone.

10. A method as defined in claim 5 wherein said third zone is a confined zone and which method includes the further steps of:
(a) heating said liquid in said third zone to a temperature at which optimum separation of said liquid into oil and water stratas is obtained;
(b) withdrawing gas from said third zone as said gas separates from said liquid in said third zone; and
(c) burning said gas to at least partially supply the heat used in heating said liquid in said third zone to said temperature at which said optimum separation takes place.

11. A method as defined in claim 10 which includes the further step of:
(a) heating said well fluid prior to discharge into said first zone by transferring heat from the liquid in said third zone to said well fluid.

12. A method as defined in claim 10 wherein said liquid in said third zone is maintained at a temperature between 90° and 110° Fahrenheit.

13. A method of separating liquid and gas from a well fluid that is under pressure, including the steps of:
(a) heating said well fluid;
(b) discharging said fluid that has been heated into a first gas and liquid separating zone, with the liquid and gas comprising said fluid in said first zone being cooled due to the expansion of said gas in said first liquid and gas separating zone;
(c) discharging gas and liquid entrained therewith from said first liquid and gas separating zone;
(d) heating said discharged gas and liquid entrained therewith;
(e) discharging said heated gas and liquid entrained therewith into a second liquid and gas separating zone, with said gas and entrained liquid being cooled in said second liquid and gas separating zone by the expansion of said gas therein;
(f) withdrawing gas as it separates from said liquid in said second liquid and gas separating zone at a sufficiently rapid rate as to maintain a pressure in said second liquid and gas separation zone that is below the pressure on said well fluid when it entered said first liquid and gas separating zone;
(g) discharging said gas that has been cooled in said second liquid and gas separating zone into a first confined space where it contacts a water-absorbing liquid and cools said liquid;
(h) discharging the cooled liquid that separates from said gas in said first liquid and gas separating zone into a second confined zone wherein the pressure is maintained below said first pressure to permit the further separation of gas from said liquid, with said gas as it separates from said liquid in said second zone being withdrawn from said second zone;
(i) heating said water-absorbing liquid to transform water therein into steam;
(j) cooling said water-absorbing liquid after said water has been vaporized therefrom by a heat exchange between said water-absorbing liquid and the cooled liquid in said second zone;
(k) discharging said water-absorbing liquid that has been cooled by said heat exchange back to said first confined space; and
(l) discharging the liquid in said second zone that has been heated by said heat exchange to a second temperature greater than said first temperature into a third zone where said liquid can stratify into layers of water and oil if any oil is present therein, and any gas carried into said third zone with said liquid will separate therefrom.

14. A method of separating liquid and gas from a well fluid that is under pressure, including the steps of:
   (a) heating said well fluid;
   (b) discharging said fluid that has been heated into a first gas and liquid separating zone, with the liquid and gas comprising said fluid in said first zone being cooled due to the expansion of said gas in said first liquid and gas separating zone;
   (c) discharging gas and liquid entrained therewith from said first liquid and gas separating zone;
   (d) heating said discharged gas and liquid entrained therewith;
   (e) sequentially discharging said heated gas and liquid entrained therewith into second and third liquid and gas separating zones, with said gas and entrained liquid being cooled in said second and third liquid and gas separating zones by the expansion of said gas therein;
   (f) heating said gas and entrained liquid as it passes between said second and third liquid and gas separating zones;
   (g) withdrawing gas as it separates from said liquid in said third liquid and gas separating zone at a sufficiently rapid rate as to maintain a pressure in said third liquid and gas separating zone that is below the pressure on said well fluid as it enters said first liquid and gas separating zone;
   (h) discharging said gas that has been cooled in said third liquid and gas separating zone into a first confined space where it contacts a water-absorbing liquid and cools said liquid;
   (i) discharging said gas from said first confined space after it has contacted said liquid to a second confined space exteriorly of said first confined space for commercial use;
   (j) withdrawing said cooled water-absorbing liquid from said first confined space and directing the same into a third confined space;
   (k) heating said cooled water-absorbing liquid in said third confined space to the extent that water therein is vaporized into steam and said steam is discharged from said third confined space;
   (l) discharging the cooled liquid that separates from said gas in said first liquid and gas separating zone into a second confined zone wherein the pressure is maintained below said first pressure to permit the further separation of gas from said liquid, with said gas as it separates from said liquid in said second zone being withdrawn from said second zone;
   (m) cooling said water-absorbing liquid after said water has been vaporized therefrom by a heat exchange between said water-absorbing liquid and the cooled liquid in said second zone;
   (n) discharging said water-absorbing liquid that has been cooled by said heat exchange back into said first confined space; and
   (o) discharging the liquid in said second zone that has been heated by said heat exchange to a second temperature greater than said first temperature into a third zone where said liquid can stratify into layers of water and oil if any oil is present therein, and any gas carried to said third zone with said liquid will separate therefrom.

References Cited by the Examiner

UNITED STATES PATENTS

| | | | |
|---|---|---|---|
| 2,728,406 | 12/55 | Maher | 55—43 X |
| 2,735,506 | 2/56 | Glasgow | 55—32 X |
| 2,812,827 | 11/57 | Worley et al. | 55—32 |
| 2,886,123 | 5/59 | Miller et al. | 55—43 |
| 3,012,629 | 12/61 | Walker et al. | 55—57 |
| 3,119,674 | 1/64 | Glasgow et al. | 55—32 X |
| 3,132,987 | 5/64 | Sinex | 55—32 X |

REUBEN FRIEDMAN, *Primary Examiner.*